United States Patent Office  3,414,976
Patented Dec. 10, 1968

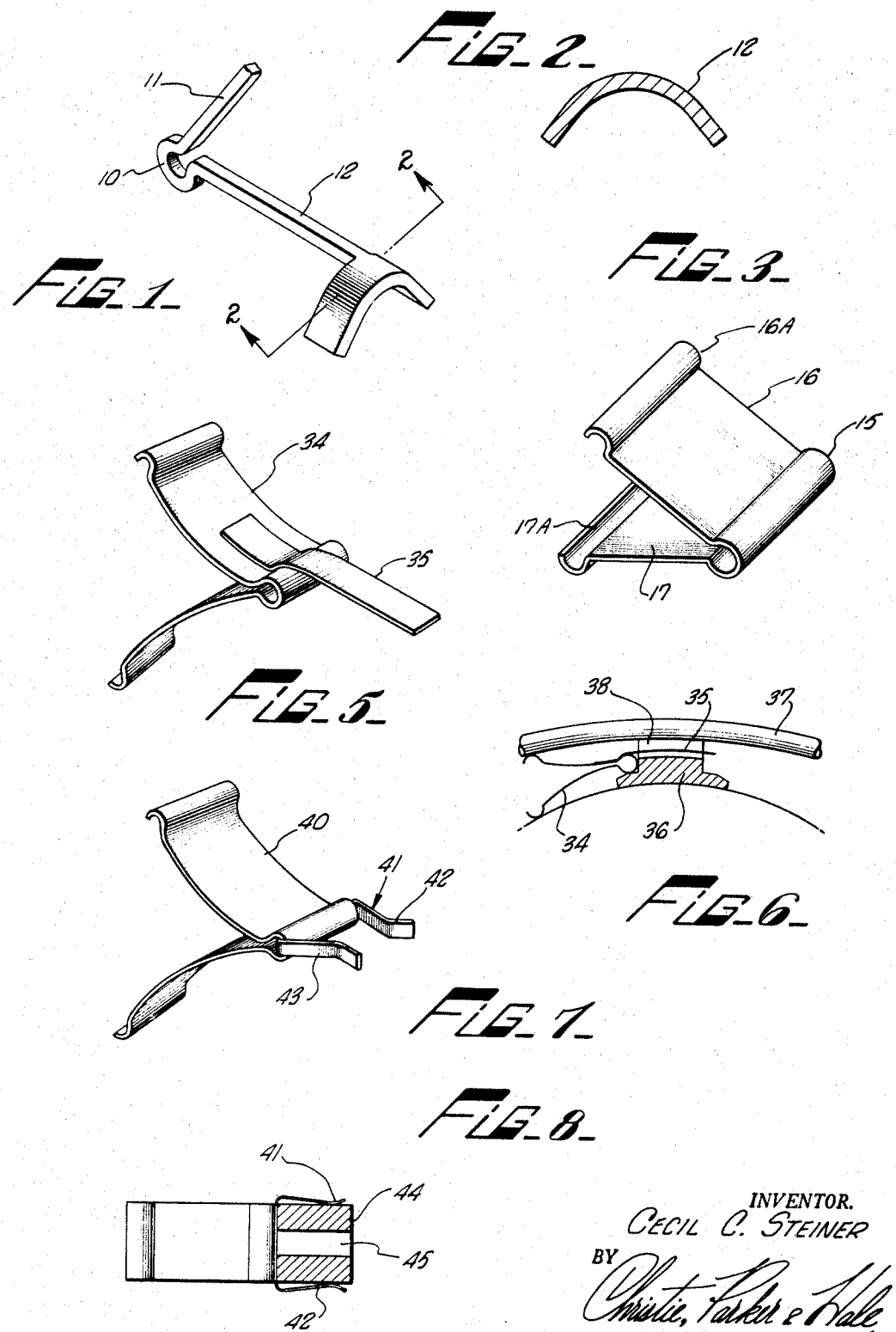

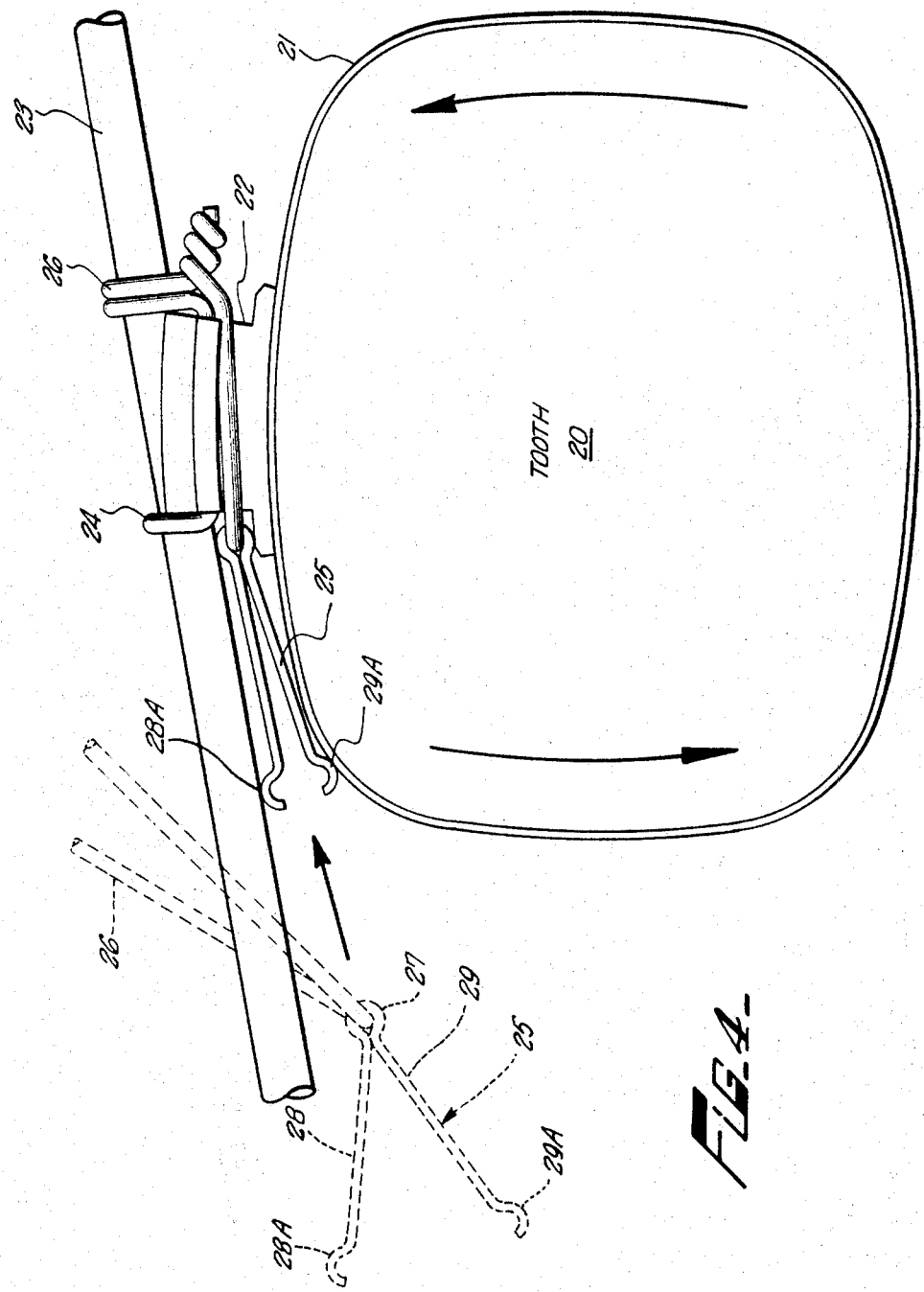

3,414,976
ORTHODONTIC SPRING WEDGE
Cecil C. Steiner, 1434 Lindacrest,
Beverly Hills, Calif. 90210
Filed Oct. 16, 1961, Ser. No. 145,214
12 Claims. (Cl. 32—14)

This invention is directed to a new orthodontic technique and appliance for accomplishing the rotational displacement of selected teeth which are subject to orthodontic treatment.

In the fixed appliance technique of orthodontia, which is commonly practiced in this country, an arch wire is generally anchored to two or more teeth and is stressed by any one of several means to apply a reorientation discipline on a pre-selected tooth or teeth. Conventionally, assembly for accomplishing this objective comprises a separate tooth band cemented around each of the involved teeth, brackets welded on each of the respective tooth bands and an arch wire interconnecting and fastened to the brackets by suitable ligatures. There are many modifications in this procedure and countless types of brackets and systems for applying controlled stress to the arch wire, but in all cases where this general system of orthodontia finds use the basic structural elements are as described.

I have now developed a new appliance which is used in combination with elements described above to enable the application of a localized rotary moment to individual teeth involved in the orthodontic program, i.e. any of the teeth subject to the discipline of the arch wire. The new appliance comprises a resilient wedge having a pair of flat arms which, in unstressed condition, diverge outwardly from a hub, the junctures of the respective arms with the hub being generally parallel and spaced apart so that a partial compression of the arms will stress the hub and bring the areas of junction together, whereupon further compression of the arms is accomplished without further significant stress of the hub. The hub provides a means by which a ligature may be linked to the wedge to secure it to a tooth bracket, the arms of the wedge being confined between and bearing respectively on the associated tooth band and the overlying arch wire. Confinement of the wedge arms places the wedge under a stressed or stored energy condition so that a conrollable rotary moment may be imposed between a surface of the tooth and the overlying arch wire for a prolonged period of time.

It will be observed that the invention therefore includes not only a new appliance but a new orthodontic technique of applying a rotational force to a tooth, which comprises the steps of fastening an arch wire to the tooth and to at least one other tooth in the patient's mouth and interposing between the arch wire and the tooth in a region spaced from the vertical centerline of the tooth a resilient wedge in a compressed attitude wherein the energy stored therein can be dissipated only by a gradual relative displacement of the tooth and arch wire in the region of the wedge.

The invention will be clearly understood from the following detailed description thereof taken in conjunction with the accompanying drawing, in which:

FIG. 1 is a perspective view of one form of resilient orthodontic wedge in accordance with the invention;

FIG. 2 is a section taken on the line 2—2 of FIG. 1;

FIG. 3 is a perspective view of an alternative form of wedge;

FIG. 4 is a diagram showing the application of the wedge of the invention to an orthodontic assembly on a tooth;

FIG. 5 shows a modified form of wedge having associated means for connection to a tooth bracket;

FIG. 6 is a sectional elevation through a tooth bracket and associated arch wire showing the application of the wedge of FIG. 5;

FIG. 7 is another modified form of the wedge with associated means for connection to a tooth bracket; and FIG. 8 is a horizontal section through a tooth bracket showing the application thereto of the wedge of FIG. 7.

The appliance shown in prespective view in FIG. 1 has a semi-tubular hub 10 from which arms 11 and 12 diverge, the angle of divergence being approximately 75°. The tubular hub 10 opens between the arms, which opening is defined by the generally parallel juncture of the respective arms with the hub and which opening, as shown, is preferably of lesser dimension than the inside diameter of the tubular hub. The hub is made tubular as illustrated to receive a retaining ligature, as will be described. Also, it will be observed with relation to the description of FIG. 4 that as the arms 11 and 12 are compressed toward each other, the opening in the hub will be closed so as to place the hub member in stressed condition.

The outer ends of the wedge arms 11 and 12 may take several shapes, one of which is illustrated in FIGS. 1 and 2. In this embodiment the extremity of each of the arms forms a curvilinear bracket, the effect of this shape being to cause the arms to lock itself in position around an associated arch wire.

As illustrated in the figure, the arms diverge from the hub at about 75°. This is a suitable orientation but is not in any sense a limitation on the construction. Although it is preferable that the arms describe an acute angle simply for ease of use, even this is not a theoretical limitation and greater angular divergence may be built into the wedge for use when unusually large spring rates are desired. Similarly, the subtended angle can be reduced to substantially less than 75°; the smaller this angle the smaller the force that will be applied if a given material and arm dimension is assumed.

The bracketing action of the arms, as accomplished through the construction of FIG. 1, is not necessary to the operation of the appliance of the invention, as will be observed from the modified wedge shown in perspective view in FIG. 3. The device of FIG. 3 includes a partially tubular hub 15 and arms 16 and 17, the structure of the hub and the relationship of the arms and the hub being generally similar to the wedge shown in FIG. 1. In the embodiment of FIG. 3 the outer ends of the arms 16 and 17 are dished respectively outwardly along the entire end edge to form curvilinear bearing surfaces 16A and 17A.

The actual use of the bracket of FIG. 3 is illustrated in FIG. 4, which is a partial orthodontic assembly as shown applied to a tooth 20. A tooth band 21 is cemented around the tooth, a conventional edgewise bracket 22 is fastened to the band as by spot welding, an arch wire 23 is engaged with the bracket 22 and is held in place by a ligature wire 24. This application of a tooth band, arch wire bracket and arch wire is in accordance with conventional practice and forms no part of the present invention.

In FIG. 4 a wedge 25 of the type shown in FIG. 3 is shown in phantom view to the left of the tooth 20 with a ligature wire 26 passing through hub 27 of the wedge. This same wedge 25 is shown in solid lines interposed between the tooth band 21 and the arch wire 23 with the hub of the wedge held in proximity to the bracket 22 by the ligature wire 26 passing around the bracket 22 and arch wire 23. The ligature wire 26 in this application serves as a convenient handle to aid the orthodontist in placing the wedge in proximity to the arch wire bracket. The normal spacing between the arch wire and the tooth, as determined by the size and configuration of the bracket 22, is such as to severely compress the divergent arms of the wedge 25. Thus, there is produced in this region between the arch wire and the margin of the tooth a stored energy which imposes, on a continuous basis, a controllable rotary moment between the tooth 20 and the arch wire 23 as illustrated by the directional arrows shown on the surface of the tooth.

Like the wedge shown in FIG. 3, the wedge 25 has dished bearing surfaces 28A, 29A at the outer extremities of the respective wedge arms 28, 29, and it is these bearing surfaces that respectively engage the arch wire 23 and the tooth band 21 as the wedge is drawn into the compressed operative position shown in the drawing.

The appliance of the invention may be made of any resilient material. For all practical purposes alloy metals with the desired spring rates and elasticity are preferred. As a specific example, 17–7 PH spring steel is suitable. It is only important to select a metal which exhibits acceptable stress characteristics and which will not reach its elastic limit before a useful amount of force can be developed. It is apparent that a great deal of leeway is available in the selection of metal alloys and in the dimensioning of the wedges, particularly with respect to the thickness of the tubular hub and of the arms so that the orthodontist may develop whatever force appears necessary to accomplish the desired objective. Similarly, and without destroying the entire complex of equipment in a patient's mouth, the appliance of the invention may be inserted and withdrawn at will as its function becomes necessary and is satisfied.

In the remaining figures of the drawing, I have shown modifications in the basic wedge structure which facilitate its use by the orthodontist, particularly as to initial engagement with the tooth bracket. In FIG. 5 a wedge 34 is generally similar to the wedge shown in FIG. 3, except that a tab member 35 is fastened to the wedge as shown including a projection anteriorly of the wedge hub. The diagram of FIG. 6 shows the application of the wedge 34 with the tab 35 interposed between a tooth bracket 36 and an arch wire 37. The conventional tooth bracket has, along its upper surface, a slot for receiving an associated arch wire. Arch wire slot 38 of the bracket 36 is shown in FIG. 6 and it is in this slot that the tab 35 resides. When the arch wire is placed in the slot over the tab, the wedge 34 is held in place and the whole assembly may be completed by the use of a single ligature passing through the wedge hub around the bracket and over the arch wire.

Another technique for accomplishing a similar objective is shown in FIGS. 7 and 8. In FIG. 7 a wedge 40, again similar to the wedge of FIG. 3, is provided with a spring clip 41 which passes through the wedge hub and is provided with clip arms 42, 43. In assembling this wedge to a bracket as shown in FIG. 8, the clip arms 41, 42 may be disposed around the outer surfaces of a bracket 44 holding the wedge in place, while an arch wire (not shown) disposed or thereafter extended through the wedge hub is tied around an arch wire receiving slot 45 of the bracket.

It is apparent that the appliance of the invention may take many different shapes and may be provided with any number of accessories for facilitating its attachment to the tooth bracket or an arch wire. In carrying out the new tooth rotation technique herein described, a wide variation in shape, size, material and spring characteristics can be tolerated and in fact may be required to realize the maximum usefulness of the procedure. The invention should in no way be construed to be limited to the specific embodiments of the resilient wedge as shown.

I claim:

1. The orthodontic method for applying a rotational force to a tooth which comprises fastening an arch wire to the tooth and to at least one other tooth in the patient's mouth and removably interposing between the arch wire and the tooth a resilient wedge having a pair of arms extending outwardly from one side of the bracket so that the arms are in a compressed attitude whereby the energy stored therein can be dissipated only by gradual relative displacement of the tooth and arch wire in the region of the wedge and the wedge can be removed without disturbing the arch wire.

2. The orthodontic method for appling a rotational force to a tooth which comprises fastening an arch wire to the tooth and to at least one other tooth in the patient's mouth and removably interposing between the arch wire and the tooth and spaced from the vertical centerline of the surface of the tooth a resilient wedge having a pair of arms extending outwardly from one side of the bracket so that the arms are in a compressed attitude whereby the energy stored therein can be dissipated only by gradual relative displacement of the tooth and arch wire in the region of the wedge and the wedge can be removed without disturbing the arch wire.

3. The orthodontic method for applying a rotational force to a tooth disciplined by an orthodontic assembly including a tooth band, an arch wire bracket fastened on the tooth band and an arch wire engaged by the bracket, which comprises drawing a resilient wedge inwardly from a free unstressed position into a confined position and removably disposing the wedge on one side only of the bracket in its confined position between the arch wire and the tooth and spaced from the vertical centerline of the tooth whereby the wedge is compressed and the energy stored therein can be dissipated only by gradual relative displacement of the tooth and arch wire in the region of the wedge and the wedge can be removed without disturbing the arch wire.

4. A resilient wedge assembly orthodontic use comprising a semi-tubular hub, a pair of arms diverging outwardly from the hub from substantially parallel extending regions of juncture with the hub which lie respectively parallel to the axis of the hub, the spacing between the junctures being less than the diameter of the hub in the unstressed position of the wedge and diminishing to mutual contact as the diverging arms are displaced toward each other, and a tab fastened at one end to the wedge and extending outwardly therefrom in a direction opposite that of the wedge arms and normal to the axis of the hub.

5. A resilient wedge assembly for orthodontic use comprising a semi-tubular hub, a pair of arms diverging outwardly from the hub from substantially parallel extending regions of juncture with the hub which lie respectively parallel to the axis of the hub, the spacing between the junctures being less than the diameter of the hub in the unstressed position of the wedge and diminishing to mutual contact as the diverging arms are displaced toward each other, and clip means engaging in the wedge and including spring clip means extending anteriorly of the wedge.

6. A structural system for effecting rotation of a person's tooth comprising in combination a tooth band adapted to be mounted around the tooth, a bracket affixed to the band to extend anteriorly of the tooth, the bracket including a channel, an arch wire extending through the channel and attached to the bracket, the arch wire extending for like attachment to at least one other tooth, a resilient wedge disposed between the tooth band and the arch wire and having a pair of arms extending outwardly from one side of the bracket and constrained by the arch wire so as to produce a spreading force between the arch wire and the tooth on one side only of the bracket, and means removably fastening the wedge in the system.

7. A structural system for effecting rotation of a person's tooth comprising in combination a tooth band adapted to be mounted around the tooth, a bracket affixed to the band to extend anteriorly of the tooth, the bracket including a channel, an arch wire extending through the channel and attached to the bracket, the arch wire extending for like attachment to at least one other tooth, a resilient wedge disposed between the tooth band and the arch wire, the wedge comprising a hub and a pair of arms diverging outwardly from the hub on the same side of the bracket and from substantially parallel extended regions of juncture with the hub which lie respectively parallel to the axis of the hub, and means removably fastening the wedge in the system with the hub lying adjacent the bracket and the arms extending outwardly from the bracket.

8. A structural system for effecting rotation of a person's tooth comprising in combination a metal band adapted to be mounted around the tooth, a bracket affixed to the band to extend anteriorly of the tooth, the bracket having a channel formed in its anterior aspect, an arch wire extending through the channel and attached to the bracket, the arch wire extending for like attachment to at least one other tooth and a resilient wedge disposed between the tooth band and the arch wire, the wedge comprising a semi-tubular hub and a pair of arms diverging outwardly from the hub from substantially parallel extending regions of juncture with the hub which lie respectively parallel to the hub axis, the spacing between the junctures being diminished to mutual contact as the diverging arms are displaced toward each other under the constraint of the arch wire and to the band and means removably fastening the wedge in the system with the hub of the wedge lying adjacent the bracket and the arms extending outwardly from the bracket.

9. An orthodontic system for effecting rotation of a tooth comprising in combination, a tooth band and bracket unit adapted to be mounted on a tooth, an arch wire secured to the bracket, spring means disposed between the band and bracket unit and the arch wire on one side of the bracket, said spring means having a pair of outwardly biased arms extending laterally on the same side of the bracket, one of said arms engaging the arch wire and the other arm engaging the band and bracket unit, and fastening means removably connecting the spring means to the bracket.

10. An orthodontic system for effecting rotation of a tooth comprising in combination, a tooth band and bracket unit adapted to be mounted on a tooth, an arch wire secured to the bracket, spring means disposed between the band and bracket unit and the arch wire on one side of the bracket, said spring means having a pair of arms extending laterally on the same side of the bracket, the arms being constrained by the arch wire so as to produce a spreading force between the arch wire and the tooth on said one side of the bracket, and fastening means removably fastening the spring means to the bracket.

11. An orthodontic system for effecting rotation of a tooth comprising in combination, a tooth band and bracket unit adapted to be mounted on a tooth, an arch wire secured to the bracket, spring means disposed between the band and bracket unit and the arch wire on one side of the bracket, said spring means having an outwardly biased arm extending laterally on the same side of the bracket and engaging the arch wire, means on the same side of the bracket engaging the band and bracket unit to apply stress in the spring means as a force tending to rotate the tooth, and fastening means removably connecting the spring means to the bracket.

12. An orthodontic system for effecting rotation of a tooth comprising in combination, a tooth band and bracket unit adapted to be mounted on a tooth, an arch wire secured to the bracket, spring means disposed between the band and bracket unit and the arch wire on one side of the bracket, said spring means having a pair of outwardly biased arms extending laterally on the same side of the bracket, one of said arms engaging the arch wire, and the other arm engaging the band and bracket unit, said spring means having means extending oppositely from said arms and adapted to engage outer surfaces of said bracket for support, and fastening means removably connecting the spring means to the bracket.

References Cited

UNITED STATES PATENTS

| | | | |
|---|---|---|---|
| 1,331,677 | 2/1920 | Schachter | 267—10 |
| 1,643,661 | 9/1927 | Kendall | 292—17 |
| 1,893,098 | 1/1933 | Murray et al. | 267—10 |
| 2,046,087 | 6/1936 | Pountnay | 267—10 |
| 2,285,653 | 6/1942 | Haberman | 267—10 |
| 2,381,128 | 8/1945 | Laskin. | |
| 1,014,029 | 1/1912 | Angle. | |
| 1,821,171 | 9/1931 | Atkinson. | |

OTHER REFERENCES

American Journal of Orthodontics, vol. 47, No. 3, March 1961 (advertisement of Unitek Corporation on page 10 relied upon).

L. W. TRAPP, *Primary Examiner.*

UNITED STATES PATENT OFFICE
CERTIFICATE OF CORRECTION

Patent No. 3,414,976            December 10, 1968

Cecil C. Steiner

It is certified that error appears in the above identified patent and that said Letters Patent are hereby corrected as shown below:

Column 1, line 16, "Conventionally," should read -- Conventionally, the --. Column 2, line 25, "arms" should read -- arm --. Column 4, line 30, "assembly orthodontic" should read -- assembly for orthodontic --.

Signed and sealed this 10th day of March 1970.

(SEAL)
Attest:

Edward M. Fletcher, Jr.            WILLIAM E. SCHUYLER, JR.
Attesting Officer            Commissioner of Patents